May 27, 1952        G. B. MURPHY        2,598,287
SHEET METAL CUTTER
Filed April 5, 1949
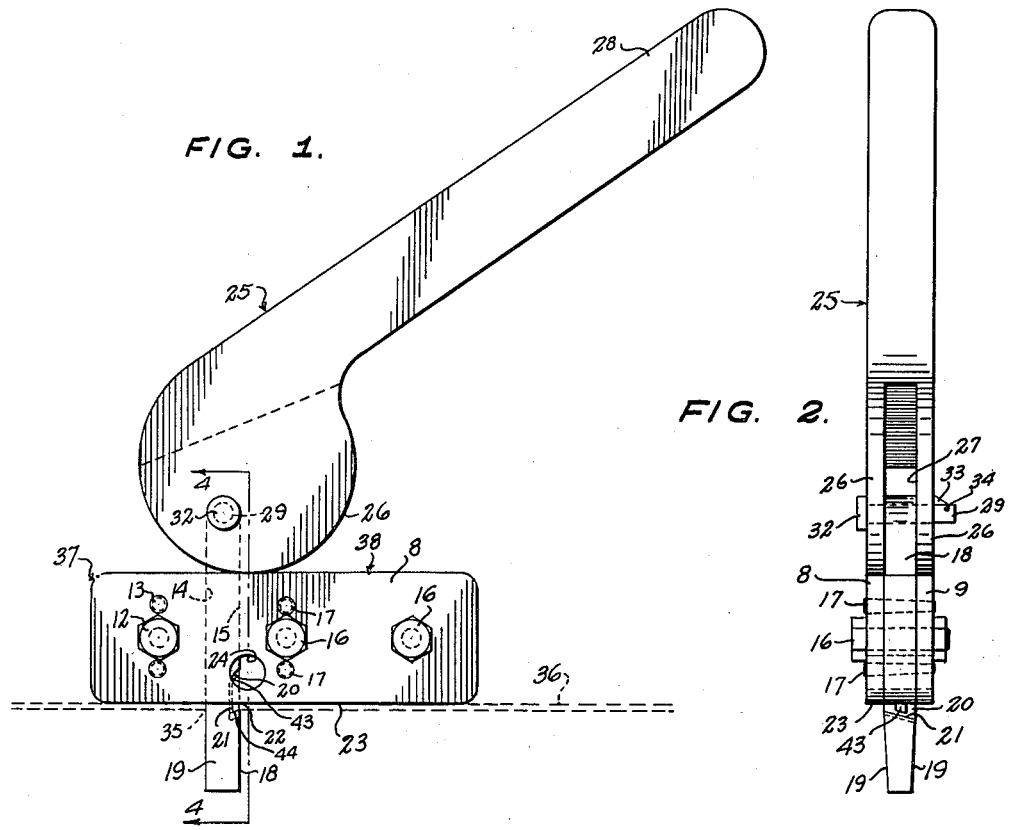
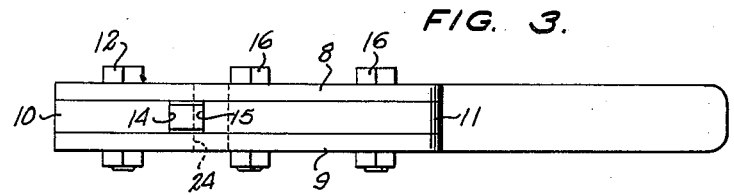
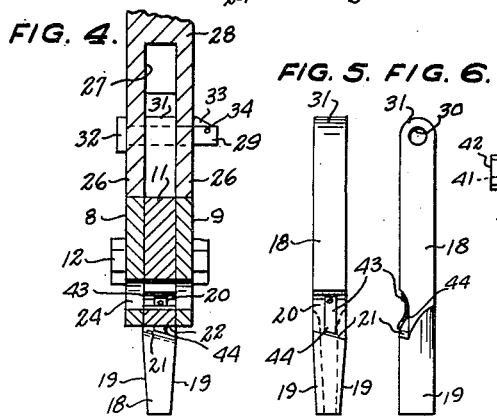
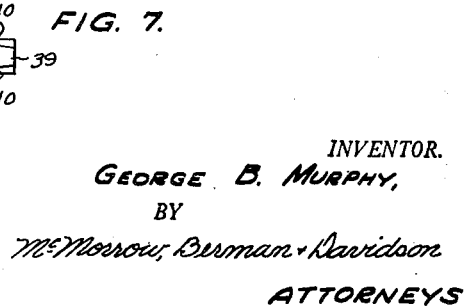
INVENTOR.
GEORGE B. MURPHY,
BY
McMorrow, Berman & Davidson
ATTORNEYS Patented May 27, 1952

2,598,287

UNITED STATES PATENT OFFICE 2,598,287

SHEET METAL CUTTER

George B. Murphy, New York, N. Y.

Application April 5, 1949, Serial No. 85,608

2 Claims. (Cl. 30—229)

This invention relates to cutters and punches, adapted to cut out predetermined areas in sheet metal, and particularly to a manually-operated sheet metal cutter.

The main object of my invention is to provide manually-operated means for cutting out rectangular and other areas in sheet metal when the edge thereof is not accessible, or when the area to be cut is not intended to start from an edge of the sheet.

Another object is to provide a cutter of the character indicated which is capable of cutting out a given area in a metal sheet piece by piece until the entire area is open.

A further object is to have such a cutting device provided with a manually-operated cutter cooperating with a die disposed upon the metal sheet to be cut and preventing any serious distortion thereof, as would occur if shears were used.

It is also an object to use a manually-operated cam connected to the cutter and rolling upon the die in such fashion as to provide powerful and positive cutting action in an upward direction.

A practical object is, of course, to have a cutting device as outlined, wherein the cutter is interchangeable with different cutters for cutting various shapes of openings in sheet metal of various types.

Other objects and advantages of the invention will appear in further detail as the specification proceeds.

In order to facilitate ready comprehension of this invention for a proper appreciation of the salient features thereof, the invention is illustrated on the accompanying drawing forming part hereof, and in which:

Figure 1 is a side elevation of a sheet metal cutter made according to my invention and embodying the same in a practical form;

Figure 2 is another elevation of the same device as seen from the right in Figure 1;

Figure 3 is a bottom plan view of the same device as seen from below in Figure 1;

Figure 4 is a vertical section taken on line 4—4 in Figure 1;

Figure 5 is an elevation of a cutting tool for the device illustrated in Figures 1 to 4;

Figure 6 is a side elevation of the same cutting tool as seen from the right side in Figure 5;

Figure 7 is a view from below of a modified cutter.

Throughout the views the same reference numerals indicate the same or like parts.

In sheet metal work, shears are frequently used to cut out portions of metal sheets, and sometimes metal saws are used for this purpose. When shears are used, it is usually necessary to start from an edge of the sheet, and in any case, a sheet cut by shears is ordinarily distorted or bent along the edge cut in this fashion. When such a sheet is to be cut without distortion, saws are sometimes resorted to and sections are sometimes even drilled out. Especially is it true that when an area is to be cut out of the sheet without this area opening to any edge of the sheet, drilling and sawing must ordinarily be resorted to as shears will hardly serve, particularly if the sheet is not to be mutilated but intended to be maintained in a flat condition, even though such drilling or sawing entails considerable work, trouble, and is quite laborious.

Upon considering this problem, it has occurred to me that a manually-operated tool should be available for cutting out areas in sheet metal when the latter is of reasonable thickness by cutting away the material piece by piece or in chips, and moving the tool step by step as the cutting proceeds. As a result, I have succeeded in producing the step-by-step sheet metal cutter which will now be described in detail.

Hence, in the practice of my invention, and referring again to the drawing, a pair of substantially flat or supporting plates 8, 9 are spaced apart a sufficient distance to receive a forward guide plate 10 and a rear die plate 11 between them, both plates 10 and 11 being of substantially the same thickness and all the plates being of hardened metal. The front guide plate 10 is secured between plates 8 and 9 by means of a bolt 12 and a pair of taper pins 13, 13 which serve to definitely locate plate 10 in a predetermined position between side plates 8 and 9, the inner or rear edge 14 of guide plate 10 being substantially vertical. In similar fashion, the cutting plate or die plate 11 is spaced a short distance rearwardly of the inner edge 14 of plate 10 with the forward edge 15 thereof substantially parallel to edge 14 of the mentioned plate 10, the plate 11 being secured by a pair of bolts 16, 16 between side plates 8 and 9, while above and below one of the two bolts adjacent to the forward end of plate 11 are a pair of taper pins 17, 17 serving to definitely locate the intermediate die plate 11 between the side plates.

The distance between the rear edge 14 of plate 10 and the forward edge 15 of die plate 11 is predetermined to be just sufficient to receive the substantially rectangular cutting tool 18 therebetween, the lower sides 19, 19 of the tool being slightly tapered downwardly, while the remaining upper portion of the tool is substantially the same width as guide plate 10 and guide plate 11, so that the resulting opening between the side plates 8 and 9 and between plates 10 and 11 will allow the tool or cutter 18 to slide vertically between said plates. A distance above the lower end of cutting tool 18 the latter has upon the rear side thereof a notch 20 forming a transverse but oblique cutting edge 21 at the lower end of the notch adapted to cooperate with the lower edge of guide plate 11 forming the lower end of the forward extremity 15 of said plate. A short distance above the bottom 23 of the plate assemblage the latter are provided with a transverse slug clearance slot 24 through which chips and slugs resulting from the cutting operation of the tool will tend to drop out at the sides of plates 8 and 9.

In order to operate the cutting tool 18, a slotted cam member, generally indicated at 25, is provided with a pair of cams or eccentric members 26, 26 spaced apart by a slot 27 and integrally connected to a handle 28 by which to manipulate cam member 25. In an eccentric position upon the cam sections 26, 26 an operating pin 29 extends transversely through both sections and the aperture 30 in the upper end 31 of cutting tool 18, the space or slot 27 between the cam sections 26 being of substantially the same transverse dimension as the thickness of the tool 18 to receive the latter slidably. The result is that the cutting tool 18 is suspended from operating pin 29 in slot 27 between cam members 26 and extends down through the plate assembly between side plates 8 and 9 and the rear edge 14 of guide plate 10 and front edge 15 of guide plate 11. In order to retain cutting tool 18 properly assembled with cam member 25, the operating pin 29 is provided with a head 32 on one end, and at the other end is pivoted a spring-actuated latch 33 upon a transverse pin 34, a concealed spring within tending to bias latch 33 outwardly to engage against the outside of one of the cam members 26 to prevent removal of the pin until a finger depresses latch 33 for such removal.

The arrangement is such that if a hole is drilled through the sheet metal to be cut, as indicated in broken lines at 35 in the sheet metal 36 and tool 18 thereafter thrust down through the aperture and the plate assembly, generally indicated at 37, placed on the metal sheet, it is self-evident that when the handle 28 of cam member 25 is in raised position, the tool will be in its lowest position. If the tool is then drawn with the entire assemblage rearwardly so that the edge of the hole enters notch 20, and handle 28 then lowered so that cam portions 26 roll upon the upper surface generally indicated at 38 of plate assembly or die 37, the cutting edge 21 of tool 18 will be positively and powerfully drawn upward and will bite a chip of sheet metal from the latter and carry the same up into clearance aperture 24. If the handle is then erected again and the tool 18 caused to descend into the hole and the whole assemblage again moved a step in the same direction, that is, toward the right, as seen in Figure 1, so that the fresh edge of the hole as just cut is again engaged in the notch 20, lowering handle 28 will again cause the tool to bite a further chip of sheet metal from sheet 36 in coaction with the lower edge 22 of guide plate 11, and as soon as the cutting edge 21 rises sufficiently to appear in clearance aperture 24, another chip of metal will be deposited in the aperture, after which the tool may again be lowered by raising handle 28 and the process continued, thus cutting the hole step by step and chip by chip larger in the direction in which the cutting tool successively cuts small pieces of the sheet while depositing the chips in clearance aperture 24 until they begin to fall out through the sides of plates 8 and 9. Due to the fact that the bottom 23 of the plate assemblage or die 37 is substantially flat, the sheet 36 will scarcely be distorted by the cutting operation, but left substantially in flat condition whether the area cut out be large or small.

The area cut by means of tool 18 when the latter is substantially rectangular in cross-section, will be substantially rectangular, but it is possible to use another tool, as indicated at 39 having the sides thereof not only tapered at 40, 40, but cut back as well and provided with a notch 41 corresponding to notch 20 in the cutting edge 42, all arranged in such fashion that when this cutter is substituted for cutter 18 of Figures 1, 2 and 3, for example, the clearances and the cut-back nature will allow the same to be directed in various directions so that irregular, round and oval areas may be cut out of the sheet. Obviously, the tools shown and described are merely examples of a great variety of such which may be used, for the rear end of the die plate 11, for example, may be concave to fit a round cutting edge upon a special tool if so desired, or any other form of bottom cutting edge upon plate 11 may be used with a corresponding tool while utilizing the principle of the present cutting device. If desired, means may be included to facilitate dislodging the metal chips initially from the cutter, such means taking the form of a curved leaf spring 43 located in notch 20 of tool 18, for example. This spring is preferably spot welded or otherwise secured at the upper end thereof within the upper end of the notch, while the lower end 44 normally extends forwardly over the cutting edge 21 of the tool. When the latter extends into the work piece 36, the edge of the work piece about to be cut engages against spring 43 and tends to flatten it rearwardly against the lower portion of the notch during the cutting operaion, but as soon as the cut has been completed and the cutting edge of the tool clears the sheet or work piece 36, the resulting metal chip just cut from the latter will be pushed out of the tool notch by immediate release of the lower end 44 of spring 43 to resume its normal curved condition.

Manifestly, variations may be resorted to and parts and features may be modified or used without others within the scope of the appended claims.

Having now fully described my invention, I claim:

1. A sheet metal cutter comprising a pair of upstanding supporting plates arranged in spaced relation, an upstanding guide plate positioned between said supporting plates and fixedly secured to said supporting plates, an upstanding die plate positioned between said supporting plates in tandem spaced relation with respect to said guide plate and fixedly secured to said supporting plates, the spacing between said guide and die plates forming an opening extending from the top to the bottom of said supporting plates, a pair of cams arranged in parallel spaced relation positioned longitudinally of said supporting plates adjacent the top of the latter and each resting upon the top of the supporting plate adjacent thereto, an eccentrically disposed pin extending transversely through and supported in said cams, a cutting tool positioned between said cams and extending through said opening and having one end pivotally supported on said pin and having the other end projecting from the bottom of said supporting plates, and a handle connecting said cams together, said cutting tool being provided with a notch extending inwardly from one side thereof adjacent to and spaced from the projecting end thereof to form a cutting edge.

2. A sheet metal cutter comprising a pair of upstanding supporting plates arranged in spaced relation, an upstanding guide plate positioned between said supporting plates and fixedly secured to said supporting plates, an upstanding die plate positioned between said supporting plates in tandem spaced relation with respect to said guide plate and fixedly secured to said supporting plates, the spacing between said guide and die plates forming an opening extending from the top to the bottom of said supporting plates, a pair of cams arranged in parallel spaced relation positioned longitudinally of said supporting plates adjacent the top of the latter and each resting upon the top of the supporting plate adjacent thereto, there being an eccentrically disposed aperture extending through each of said cams, the apertures being in registry, a pin extending through and supported in said apertures, a head on one end of said pin and bearing against the one of said cams adjacent thereto, a spring actuated latch on the other end of said pin and engageable against the other of said cams, a cutting tool positioned between said cams and extending through said opening and having one end pivotally supported on said pin and having the other end projecting from the bottom of said supporting plates, and a handle connecting said cams together, said cutting tool being provided with a notch extending inwardly from one side thereof adjacent to and spaced from the projecting end thereof to form a cutting edge.

GEORGE B. MURPHY.

REFERENCES CITED

The following references are of record in the file of this patent:

UNITED STATES PATENTS

| Number | Name | Date |
|---|---|---|
| 356,492 | Morrill | Jan. 25, 1887 |
| 1,443,002 | Buker | Jan. 23, 1923 |
| 1,812,350 | Lingwood | June 30, 1931 |
| 2,329,387 | Brenning | Sept. 14, 1943 |

FOREIGN PATENTS

| Number | Country | Date |
|---|---|---|
| 844,117 | France | July 19, 1939 |